(12) United States Patent
Müller

(10) Patent No.: US 7,121,702 B2
(45) Date of Patent: Oct. 17, 2006

(54) LAMINATE MATERIAL COMPONENT AND METHOD FOR ITS PRODUCTION

(75) Inventor: Burkhard Müller, Wehrheim (DE)

(73) Assignee: E.I.S. Electronics GmbH, Bremerhaven (DE)

( * ) Notice: Subject to any disclaimer, the term of this patent is extended or adjusted under 35 U.S.C. 154(b) by 164 days.

(21) Appl. No.: 10/985,740

(22) Filed: Nov. 10, 2004

(65) Prior Publication Data

US 2005/0265038 A1     Dec. 1, 2005

(30) Foreign Application Priority Data

May 28, 2004     (DE)     ........................ 10 2004 026 835

(51) Int. Cl.
- F21V 8/00     (2006.01)
- G09F 13/18    (2006.01)
- B64D 47/02    (2006.01)

(52) U.S. Cl. ...................... 362/511; 362/471; 362/559; 362/581; 385/901

(58) Field of Classification Search ................ 362/511, 362/471, 554, 559, 576, 581; 40/547; 385/120, 385/901
See application file for complete search history.

(56) References Cited

U.S. PATENT DOCUMENTS

| | | | |
|---|---|---|---|
| 2,035,998 A * | 3/1936 | Thompson | .................. 362/559 |
| 4,106,231 A * | 8/1978 | MacNiel | ........................ 40/547 |
| 4,754,372 A | 6/1988 | Harrison | ...................... 362/565 |
| 5,782,023 A * | 7/1998 | Iannantuano et al. | ......... 40/547 |
| 5,823,652 A * | 10/1998 | Vann | ........................... 362/554 |
| RE36,642 E * | 4/2000 | Ziadi | ........................... 362/471 |
| 6,082,886 A | 7/2000 | Stanford | ..................... 362/576 |
| 6,106,140 A * | 8/2000 | Krummer et al. | ........... 362/471 |
| 6,256,811 B1 * | 7/2001 | Nelson | ........................ 40/547 |
| 6,840,662 B1 * | 1/2005 | Isaacson et al. | ............ 362/581 |

FOREIGN PATENT DOCUMENTS

| | | |
|---|---|---|
| DE | 196 10 138 A1 | 9/1997 |
| DE | 199 26 782 A1 | 12/2000 |
| DE | 102 00 750 | 7/2003 |
| EP | 1102231 | 5/2001 |
| WO | WO 2004/017109 | 2/2004 |

* cited by examiner

Primary Examiner—Alan Cariaso
(74) Attorney, Agent, or Firm—Collard & Roe, P.C.

(57) ABSTRACT

A laminate material component made of a foam or honeycomb core and at least two cover layers bonded to the core, lying on opposite sides of it. At least one illumination device is embedded in the laminate material component. According to the invention, the illumination device is formed by light wave guides that are connected with a light source.

18 Claims, 2 Drawing Sheets

LAMINATE MATERIAL COMPONENT AND METHOD FOR ITS PRODUCTION

BACKGROUND OF THE INVENTION

1. Field of the Invention

The invention relates to a laminate material component, in particular a side or overhead paneling element for a vehicle or an aircraft, made of a foam and/or honeycomb core. There are at least two cover layers bonded to the core, lying on opposite sides of it, and at least one means of illumination embedded in the core and/or a cover layer. Furthermore, the invention relates to a method for the production of such a laminate material component.

2. The Prior Art

In passenger aircraft, the cabin lighting is frequently provided by fluorescent tubes that are disposed in the region of the side or overhead paneling elements, in a covered manner. In addition, individual means of lighting are usually also provided for every seat, and these can be combined with switch elements, safety elements such as an oxygen mask or the like, and display elements, in a service unit. Such a service unit is described, for example, in German Patent No. DE 199 26 782 A1.

In German Patent No. DE 196 10 138 C2, a reading lamp system for a passenger aircraft is proposed, in which a reading lamp is assigned to every passenger seat. The known system consists of a cold light lamp as the light source, to which a plurality of reading lamps is connected by means of decoupling optics, by way of several light wave guides.

Both the interior lighting of a passenger aircraft cabin by fluorescent tubes, and individual lighting of a passenger seat by a reading lamp are suitable only to a slight degree for producing lighting that is individual for the airlines, for example, which lighting can also serve for entertainment of the passengers or for creating a pleasant atmosphere in the aircraft cabin.

SUMMARY OF THE INVENTION

It is therefore an object of the present invention to make available a laminate material component of the type stated initially, as well as a method for its production, which allows for an individual integration of lighting, at low production costs and as minimal a weight as possible.

This task is accomplished, according to the invention, essentially in that several passage bores are provided in the core and at least one cabin-side cover layer, and several grooves are provided on the core and/or in a back cover layer, whereby light wave guides are embedded in the passage bores and the grooves, which are connected with a light source disposed on the back cover layer. By means of the light wave guides, many points of light can be created on the cabin-side cover layer of the laminate material component, proceeding from a single light source. Since the light wave guides are accommodated in the passage bores and the grooves, no loose cables or light wave guides occur, which could have a disruptive effect. The definition of the cover layers of the laminate material component as a cabin-side or a back cover layer is selected, in the present case, only to be able to better distinguish between the cover layers. Of course, it is also possible, if the purpose of use were to require this, to dispose the light source on the side of the laminate material component that faces a cabin, while the passage bores in which the light wave guides are disposed are embedded in the opposite, back cover layer.

Since the effectiveness of incandescent bulbs is relatively low, even when using halogen lamps, the light source is formed, according to a preferred embodiment of the invention, by at least one light-emitting diode. By using such a cold light lamp as the light source, the complicated cooling measures that are sometimes required can be eliminated, since light-emitting diodes emit only a comparatively low energy portion as waste heat.

In order to restrict the movement of the light wave guides within the laminate material component, to a great extent, the light source is fixed in place on the back cover layer, and the light wave guides are fixed in place in the passage bores and/or the grooves. Loose light wave guides that can result in tapping noises or damage are thereby prevented.

If the light source can be releasably connected with an energy source and/or a control device by way of a cable hank and a connection unit, particularly a plug, the laminate material component according to the invention can be easily installed and un-installed. Thus it is sufficient to merely remove a small plug in order to separate the laminate material component with the integrated lighting means from the energy supply and the energy control. In this manner, light-emitting diodes can be controlled so that they can be dimmed, can flicker, or can provide constant background lighting, for example by way of a six-pole plug, so that a plurality of light effects can be achieved with the laminate material component according to the invention.

The light wave guides have PMMA fibers and/or glass fibers, for example. Since PMMA fibers are not provided with a mantling, as glass fibers are, and since they can also be cut better, the use of PMMA fibers, for example having a thickness of 0.75 mm to 1.5 mm, is preferred for the light wave guides.

In order to achieve as appealing an appearance of the laminate material component as possible on the cabin side, the light wave guides should not project out of the cabin-side cover layer, or should not project significantly. Therefore the light wave guides are barely perceptible when the light source is switched off.

If the passage bores have an inside diameter that essentially corresponds to the outside diameter of the light wave guides, the light wave guides can be fixed in place in the passage bores even without using an adhesive or the like.

As an alternative to this, the passage bores in the core can have a larger diameter than in the cabin-side cover layer, whereby a sleeve can be embedded in the core on the cabin side, in order to accommodate the light wave guides and fix them in place. It is true that this alternative is more cost-intensive to produce, but it allows particularly secure fixation of the light wave guides in the laminate material component according to the invention.

In a further development of the idea of the invention, it is provided that the passage bores are disposed on the core and in the cabin-side cover layers to form a geometrical pattern or constellations or the like. For example, the logo of an airline can be represented on the ceiling of the cabin by means of points of light.

The task underlying the invention is furthermore accomplished by means of a method for the production of a laminate material component that demonstrates the following steps: First, the cabin-side cover layer is bonded to a foam and/or honeycomb core and brought into a suitable shape. Subsequently, several passage bores are made in the core and the cabin-side cover layer, and several grooves are made in the side of the core facing away from the cabin-side cover layer. Light wave guides can then be inserted into the passage bores and grooves. Subsequently, a back cover layer is bonded to the core, and the light wave guides can be connected with a light source.

The method according to the invention therefore differs from the usual production of a sandwich component in that the first step is not that two cover layers are applied to the core and this laminate is pressed into a suitable shape, but rather, first only one cover layer is bonded to the core material. This makes it possible to insert the light wave guides into the grooves and passage bores formed in the core, and to close the grooves with the second cover layer. This has the result that the second cover layer is not weakened by passage bores or the like, which would reduce the bearing capacity of the entire structure. Furthermore, the light wave guides can be fixed in place in the laminate material component particularly well in this manner.

In a further development of this idea, the light wave guides can be additionally fixed in place in the grooves by means of puttying and/or gluing them in place. In this way, the ability of the laminate material component to withstand stress can also be increased.

In order to achieve an appealing appearance of the laminate material component on the side facing a cabin or the like, the cabin-side cover layer is preferably provided with a coating on its side facing away from the core. This can be, for example, a decorative film that is glued onto the cabin-side cover layer. As an alternative to this, however, it is also possible to varnish the cabin-side cover layer.

If the light wave guides are inserted into the passage bores before the coating is applied, in such a manner that the light wave guides project out of the core and the cover layer on the cabin side, a varnish or similar coating can be applied to the cover layer after the light wave guides have been inserted. In this connection, the ends of the light wave guides that project out of the cover layer are also varnished. After the coating has hardened, the light wave guides can then be cut to fit, according to the invention, in such a manner that they do not project out of the cabin-side cover layer, or project only insignificantly. As a result, the ends of the light wave guides are barely perceptible when the light source is switched off.

As an alternative to this, however, it is also possible that the passage bores are made in the cabin-side cover layer only after the coating has been applied, or that the passage bores that might have been closed off by the coating are opened again before the light wave guides are inserted.

In order not to damage the light wave guides, it is preferred if the back cover layer applied to the core after the light wave guides have been placed consists, for example, of a duoplastic that can be cured and shaped at temperatures below 150° C. When using PMMA fibers as light wave guides, in particular, the back cover layer can be cold-cured, in order not to damage the light wave guides. In any case, the temperature should not exceed values at which damage to the light guide fibers or the mantling of the fibers occurs, for example due to shrinkage or the occurrence of brittleness.

Using the method according to the invention, it is possible to integrate several light wave guides into the laminate material component. Thus, for example, about 50 to 150 light wave guides can be accommodated in a laminate material component that has the size of a conventional interior paneling panel for passenger aircraft. In this connection, the light wave guides run from their exit point in the cover layer on the cabin side to the light source, whereby they can be brought together at least in the vicinity of the light source, to form a light wave hank (fiber bundle). To secure the light wave guides, individual light wave guides or the light wave guide hank can be provided with a mantling, for example. Such a mantling can take place with Megolon or with a fabric hose, for example.

In addition to the light source mounted on the back cover layer, which is connected with the light wave guides, additional light sources can be provided on the cabin side, in and/or on the laminated material component. Thus, for example, individual light-emitting diodes can be integrated into the cabin-side cover layer, in order to produce additional light effects.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Referring now in detail to the drawings, the laminate material component 1 shown in the figures has a sandwich structure having a honeycomb core 2 and cover layers 3 and 4, respectively, disposed on sides of core 2 that lie opposite one another. Cover layer 3 that is the lower layer in the figures can face a passenger cabin in an aircraft or vehicle, for example, as a paneling element, when using the laminate material component 1.

Figure 1:
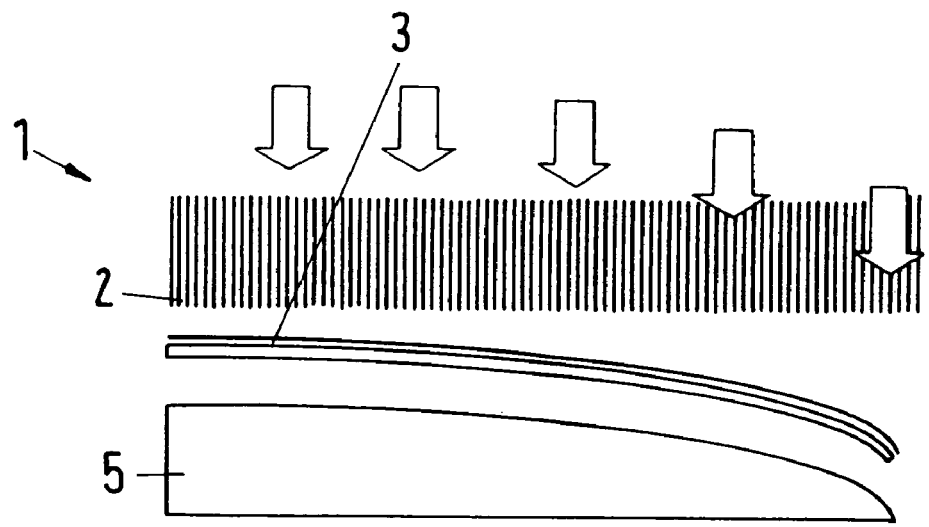
FIG. 1 shows the process of shaping and bonding a cabin-side cover layer to a core.

As is indicated by the arrows in FIG. 1, laminate material component 1 is produced in that the cabin-side cover layer 3 as well as the core 2 are bonded to one another, and brought into a suitable shape, on a schematically indicated mold body 5. This can take place under pressure and/or temperature action.

Figure 2:
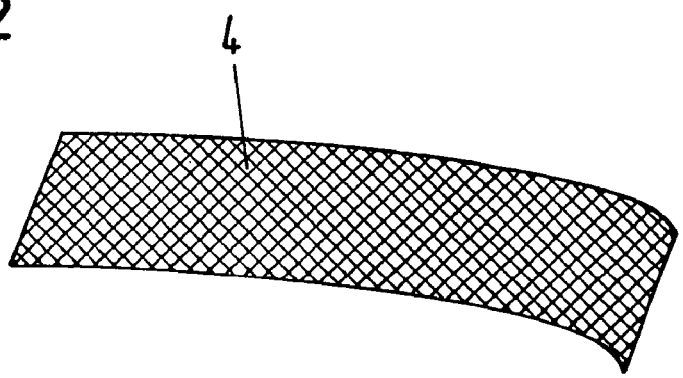
FIG. 2 shows a core with light wave guides embedded in it.
Figure 2:
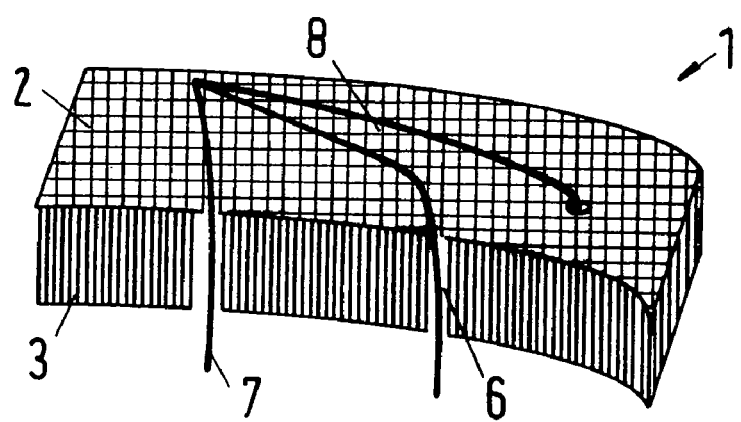

Then, as indicated in FIG. 2, passage bores 6 are made in the laminate material component, which at first consists only of the cabin-side cover layer and the core, into which light wave guides 7 can be introduced. In addition, grooves 8 are milled or cut into the side of core 2 that faces away from cabin-side cover layer 3, into which the light wave guides 7 can be laid. The core 2 can then be closed off with back cover layer 4, on the side that faces away from the cabin-side cover layer. Before that happens, light wave guides 7 can be fixed in place in the passage bores 6 and/or in the grooves 8 by means of gluing or the like.

Approximately 50 to 150 passage bores 6, for example, are provided in a laminate material component 1 that serves as a paneling element for an aircraft cabin or the like; a light wave guide 7 is embedded in each. The light wave guides 7 are bundled into one or a few light wave guide hanks 9, which are passed through one or a few openings 10 in the back cover layer 4.

Light wave guides 7 are connected with a light source 11, in known manner, for example by means of decoupling optics; in the exemplary embodiment shown, this source is formed by a light-emitting diode arrangement. Light source 11 is fixed in place on back cover layer 4. For a connection to an energy source and/or a control device, light source 11 is provided with cables 12 and a suitable connection device 13.

Figure 3:
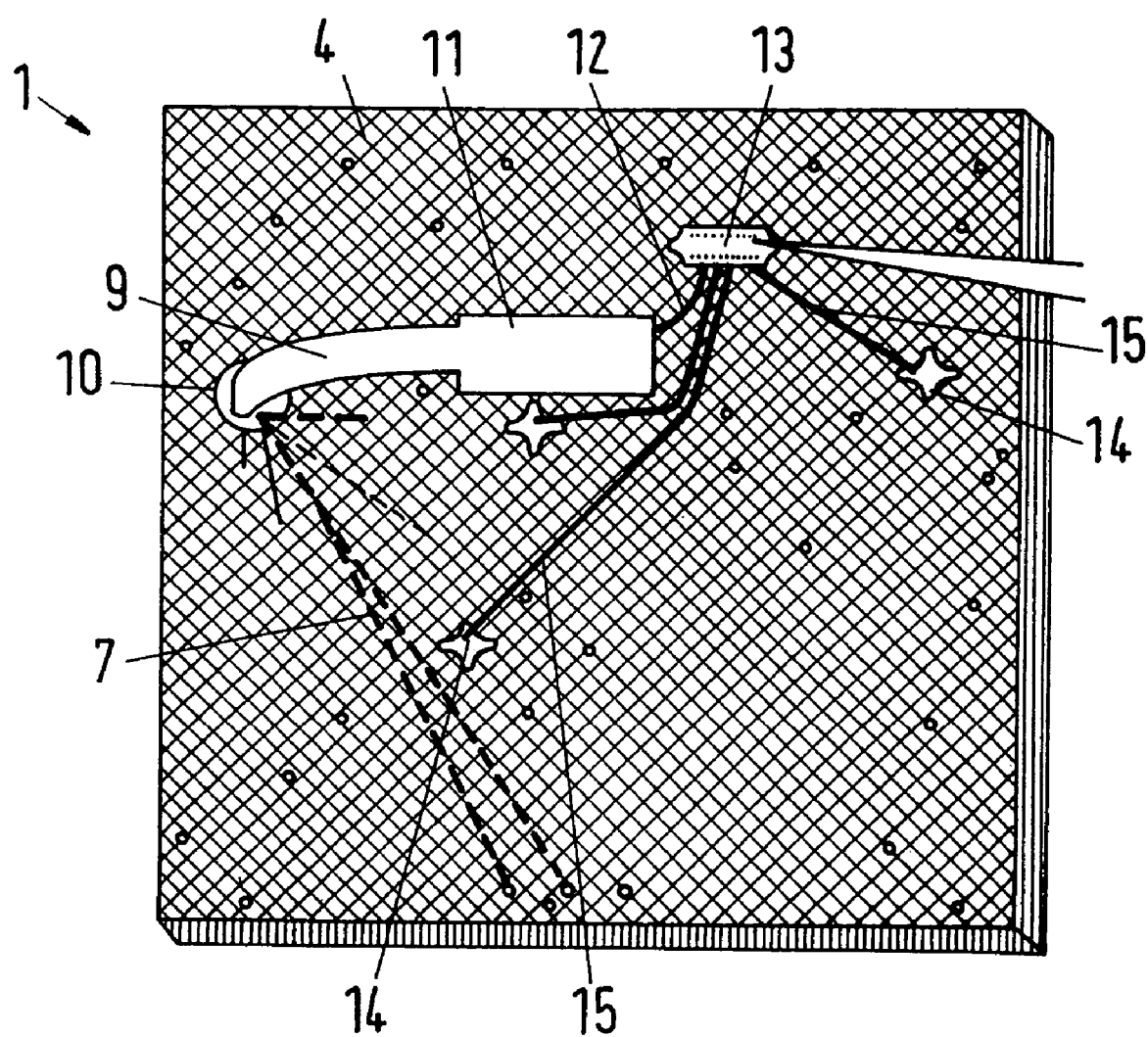
FIG. 3 shows a view of a back cover layer of a laminate material component according to the invention.

As shown in FIG. 3, other light sources 14 can be provided in the laminate material component 1, in addition to light source 11 having light wave guides 7; these can also be formed by light-emitting diodes, for example. In the embodiment shown, the other light sources 14 are also connected with connection element 13 by way of cables 15, for a connection to an energy source and/or a control device.

Accordingly, while only a few embodiments of the present invention have been shown and described, it is obvious that many changes and modifications may be made thereunto without departing from the spirit and scope of the invention.

REFERENCE SYMBOL LIST

1 laminate material component
2 core
3 cabin-side cover layer
4 back cover layer
5 mold body
6 passage bore
7 light wave guide
8 groove
9 light wave guide hank
10 opening
11 light source
12 cable
13 connection element
14 light source
15 cable

What is claimed is:

1. A laminate material component, comprising:
    a foam or honeycomb core;
    at least two cover layers bonded to the core, lying on opposite sides of the core to form at least one cabin-side cover layer and at least one back cover layer, wherein there are several passage bores in the core and in the at least one cabin-side cover layer, and several grooves on the core or in the at least one back cover layer;
    light wave guides embedded in the passage bores and the grooves, which are connected with a light source disposed on the back cover layer.

2. The laminate material component as recited in claim 1, wherein the light source is at least one light-emitting diode.

3. The laminate material component as recited in claim 1, wherein the light source is fixed in place on the back cover layer, and the light wave guides are fixed in place in the passage bores or the grooves.

4. The laminate material component as recited in claim 1, wherein the light source can be connected with an energy source or a control device by way of a cable hank and a connector element.

5. The laminate material component as recited claim 1, wherein the light wave guides have PMMA fibers and/or glass fibers.

6. The laminate material component as recited in claim 1, wherein the light wave guides do not significantly project out of the cabin-side cover layer.

7. The laminate material component as recited in claim 1, wherein the passage bores have an inside diameter that substantially corresponds to the outside diameter of the light wave guides.

8. The laminate material component as recited in claim 1, wherein the passage bores in the core have a greater diameter than in the cabin-side cover layer.

9. The laminate material component as recited in claim 8, further comprising a sleeve for accommodating one of the light wave guides and fixing said light wave guide in place, said sleeve being embedded in the core on the cabin side.

10. The laminate material component as recited in claim 1, wherein the passage bores in the core and the cabin-side cover layer are disposed in accordance with a pattern.

11. A method for the production of a laminate material component, comprising the following steps:
    (a) bonding and shaping a cabin-side cover layer with a foam and/or honeycomb core;
    (b) making several passage bores in the core and the cabin-side cover layer and making several grooves in a side of the core that faces away from the cabin-side cover layer;
    (c) inserting several light wave guides into the passage bores or the grooves;
    (d) bonding a back cover layer to the core, and
    (e) connecting the light wave guides to a light source.

12. A method as recited in claim 11, wherein the light wave guides are fixed in place at least in the grooves by means of puttying and/or gluing.

13. A method as recited in claim 11, wherein the cabin-side cover layer is provided with a coating on a side facing away from the core.

14. A method as recited in claim 13, wherein the light wave guides are inserted into the passage bores before the coating is applied, so that the light wave guides project out of the core and the cover layer on the cabin side, and wherein after application of the coating, the light wave guides are cut to fit, so that said light wave guides do not significantly project out of the cabin-side cover layer.

15. A method as recited in claim 13, wherein the passage bores are only made in the cabin-side cover layer after application of the coating.

16. Method as recited in claim 11, wherein the back cover layer applied to the core after the light wave guides have been placed consists of a duoplastic that can be cured and shaped at temperatures below 150° C.

17. Method as recited in claim 11, wherein more than 25, light wave guides are brought together in the vicinity of the light source to form a light wave guide hank and are integrated into the laminate material component.

18. Method as recited in claim 11, wherein in addition to the light wave guides connected with the light source, additional light sources are provided on the cabin side, in or on the laminated material component.

* * * * *